United States Patent
Adams et al.

(10) Patent No.: US 10,826,864 B2
(45) Date of Patent: Nov. 3, 2020

(54) ARTIFICIALLY INTELLIGENT MESSAGING

(71) Applicants: AT&T Intellectual Property I, L.P., Atlanta, GA (US); AT&T Mobility II LLC, Atlanta, GA (US)

(72) Inventors: Edward Adams, Kenmore, WA (US); Karolina McLean Abbott, Decatur, GA (US); Tricia McKinley, Medina, WA (US); Charles Barker, Kirkland, WA (US); Melissa McCormick, Swannanoa, NC (US); Marc Sullivan, Austin, TX (US); Ronald Noble, Eatontown, NJ (US)

(73) Assignees: AT&T INTELLECTUAL PROPERTY I, L.P., Atlanta, GA (US); AT&T MOBILITY II LLC, Atlanta, GA (US)

( * ) Notice: Subject to any disclaimer, the term of this patent is extended or adjusted under 35 U.S.C. 154(b) by 34 days.

(21) Appl. No.: 16/047,134

(22) Filed: Jul. 27, 2018

(65) Prior Publication Data
US 2020/0036670 A1 Jan. 30, 2020

(51) Int. Cl.
*G06F 15/16* (2006.01)
*H04L 12/58* (2006.01)
(Continued)

(52) U.S. Cl.
CPC .......... *H04L 51/32* (2013.01); *G06F 16/2465* (2019.01); *H04L 67/306* (2013.01); *G06F 2216/03* (2013.01); *G06N 5/02* (2013.01)

(58) Field of Classification Search
CPC ... H04L 51/32; H04L 67/306; G06F 16/2465; G06F 2216/03; G06N 5/02
(Continued)

(56) References Cited

U.S. PATENT DOCUMENTS 6,067,537 A   5/2000  O'Connor et al.
6,424,997 B1  7/2002  Buskirk, Jr. et al.
(Continued)

FOREIGN PATENT DOCUMENTS

KR   20140042994 A    4/2014
KR   20140125486 A   10/2014
(Continued)

OTHER PUBLICATIONS

Ritter, Alan et al., "Data-Driven Response Generation in Social Media," Proceedings of the 2011 Conference on Empirical Methods in Natural Language Processing, Jul. 27-31, 2011, pp. 583-593, Association for Computational Linguistics, 2011.
(Continued)

*Primary Examiner* — Atta Khan (57) ABSTRACT

The present disclosure describes a device, computer-readable medium, and method for generating messages that are customized for an individual human recipient. In one example, the method includes identifying a target to whom a message is to be sent, a goal of the message, and a topic of the message, retrieving information relevant to the topic from a library of core content, wherein the core content comprises a plurality of fixed inputs, building the message using the information retrieved from the library of core content, wherein the building comprises presenting the information retrieved from the library of core content in a manner that is customized for the target, delivering the message to the target via a delivery medium, wherein a selection of the delivery medium is customized for the target, and soliciting feedback from the target to confirm that the goal of the message has been achieved.

20 Claims, 4 Drawing Sheets

(51) Int. Cl.
  *H04L 29/08* (2006.01)
  *G06F 16/2458* (2019.01)
  *G06N 5/02* (2006.01)

(58) Field of Classification Search
  USPC .......................................................... 709/206
  See application file for complete search history.

(56) References Cited

U.S. PATENT DOCUMENTS

| | | | |
|---|---|---|---|
| 6,816,885 | B1 | 11/2004 | Raghunandan |
| 8,639,517 | B2 | 1/2014 | Di Fabbrizio et al. |
| 8,954,330 | B2 | 2/2015 | Koenig et al. |
| 9,049,259 | B2 | 6/2015 | Rathod |
| 9,276,775 | B2 | 3/2016 | Anantharaman et al. |
| 9,306,878 | B2 | 4/2016 | Patil |
| 9,514,467 | B2 | 12/2016 | De et al. |
| 9,549,068 | B2 | 1/2017 | Krishnan et al. |
| 9,684,651 | B2 | 6/2017 | Connor et al. |
| 9,697,192 | B1 | 7/2017 | Estes et al. |
| 9,742,718 | B2 | 8/2017 | Zeng et al. |
| 9,852,379 | B2 | 12/2017 | Beigman Klebanov et al. |
| 2012/0158615 | A1* | 6/2012 | Spring ............... G06F 40/40 706/10 |
| 2014/0270108 | A1* | 9/2014 | Riahi ................. G06N 20/00 379/88.01 |
| 2015/0006295 | A1 | 1/2015 | Liu et al. |
| 2016/0342317 | A1 | 11/2016 | Lim et al. |
| 2016/0352656 | A1 | 12/2016 | Galley et al. |
| 2018/0052850 | A1 | 2/2018 | Chatterjee et al. |
| 2018/0089588 | A1 | 3/2018 | Ravi et al. |
| 2018/0109476 | A1 | 4/2018 | Braun et al. |
| 2018/0159888 | A1 | 6/2018 | Irimie et al. |

FOREIGN PATENT DOCUMENTS

| | | |
|---|---|---|
| WO | 0074323 A1 | 12/2000 |
| WO | 2016176234 A1 | 11/2016 |
| WO | 2017041370 A1 | 3/2017 |
| WO | 2018033066 A1 | 2/2018 |
| WO | 2018061776 A1 | 4/2018 |

OTHER PUBLICATIONS

"Make your virtual assistant 'Employee of the Year'." Omni-Channel Customer Service, nuance.com, White Paper, Feb. 27, 2017. https://web.archive.org/web/20180615125021/https://www.nuance/com/content/dam/nuance/en_au/collateral/enterprise/white-paper/wp-make-your-virtualassistant-employee-of-the-year-en-us.pdf.

Kannan, Anjuli, et al. "Smart reply: Automated response suggestion for email." Proceedings of the 22nd ACM SIGKDD International Conference on Knowledge Discovery and Data Mining, ACM, 2016.

Carbune, Victor et al., "Context based automatic email responses," Technical Disclosure Commons, Nov. 7, 2017, pp. 1-7, http://www.tdcommons.org/dpubs_series/792.

* cited by examiner

ARTIFICIALLY INTELLIGENT MESSAGING

The present disclosure relates generally to automated assistance, and relates more particularly to artificially intelligent devices, non-transitory computer-readable media, and methods for generating messages that are customized for an individual human recipient.

BACKGROUND

As the intelligence of and knowledge available to computers increases, automated systems are increasingly being relied upon as an efficient way to provide information. For instance, automated messaging systems can be used to generate messages that provide human users with information related to customer service, technical support, travel, medical, or financial information, general knowledge, and the like. Often, these systems are interactive in the sense that the systems may exchange a series of messages with their human users, much as two humans might carry on a conversation.

SUMMARY

The present disclosure describes a device, computer-readable medium, and method for generating messages that are customized for an individual human recipient. In one example, the method includes identifying a target to whom a message is to be sent, a goal of the message, and a topic of the message, retrieving information relevant to the topic from a library of core content, wherein the core content comprises a plurality of fixed inputs, building the message using the information retrieved from the library of core content, wherein the building comprises presenting the information retrieved from the library of core content in a manner that is customized for the target, delivering the message to the target via a delivery medium, wherein a selection of the delivery medium is customized for the target, and soliciting feedback from the target to confirm that the goal of the message has been achieved.

In another example, a device includes a processor and a computer-readable medium storing instructions which, when executed by the processor, cause the processor to perform operations. The operations include identifying a target to whom a message is to be sent, a goal of the message, and a topic of the message, retrieving information relevant to the topic from a library of core content, wherein the core content comprises a plurality of fixed inputs, building the message using the information retrieved from the library of core content, wherein the building comprises presenting the information retrieved from the library of core content in a manner that is customized for the target, delivering the message to the target via a delivery medium, wherein a selection of the delivery medium is customized for the target, and soliciting feedback from the target to confirm that the goal of the message has been achieved.

In another example, a non-transitory computer-readable storage medium stores instructions which, when executed by a processor, cause the processor to perform operations. The operations include identifying a target to whom a message is to be sent, a goal of the message, and a topic of the message, retrieving information relevant to the topic from a library of core content, wherein the core content comprises a plurality of fixed inputs, building the message using the information retrieved from the library of core content, wherein the building comprises presenting the information retrieved from the library of core content in a manner that is customized for the target, delivering the message to the target via a delivery medium, wherein a selection of the delivery medium is customized for the target, and soliciting feedback from the target to confirm that the goal of the message has been achieved.

BRIEF DESCRIPTION OF THE DRAWINGS

The teachings of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

In one example, the present disclosure generates messages that are customized for an individual human recipient. As discussed above, automated systems are increasingly being relied upon as an efficient way to provide information. For instance, automated messaging systems can be used to generate messages that provide human users with information related to customer service, technical support, travel, medical, or financial information, general knowledge, and the like. Often, these systems are interactive in the sense that the systems may exchange a series of messages with their human users, much as two humans might carry on a conversation.

Gauging just how well the human users understand the information that the automated systems are providing can be difficult, in large part due to the fact that different people have different learning styles, cognitive strengths, and/or physical (e.g., visual, auditory, etc.) abilities. However, tailoring messages for each individual recipient has, up to this point, proven to be largely infeasible due to the high cost of human labor that would be required to version each "core message" into a plurality of customized or unique, recipient specific messages. As such, most systems construct messages (referred to herein as "average messages") that are designed to target the largest number of recipients with the fewest number of variations. Inevitably, the use of average messages leads to unresolved issues for individual recipients, which, in turn, creates inefficiencies in the interaction and potential loss of time, money, and/or productivity for both the entities on whose behalf the automated systems operate (i.e., sources of knowledge or information) and for the individual recipients.

Examples of the present disclosure generate unique messages that are customized to maximize understanding by an intended recipient (also referred to herein as a "target"). In some examples, the content of a message, the medium of the message (e.g., visual, audible, tactile, etc.), and the platform via which the message is delivered (e.g., touch screen, smart speaker, television, audio player, electronic book reader, electronic billboard, augmented or virtual reality hardware, etc.) are all selected specifically for the target, in order to maximize the target's understanding of the information conveyed in the message. The delivery of the messages may take the form of a conversation, where a series of unique message fragments may alternate between queries for additional information/clarification and tests of the target's understanding, until a threshold understanding is achieved. The content of the messages, the media of the messages, and the delivery platforms may be dynamically modified in the course of the conversation to improve the target's understanding. In some examples, each unique message is built for a one-time use (e.g., is not saved or re-used).

The unique messages generated by the present disclosure could be useful in a variety of applications even beyond the automated systems described above. The unique messages could be used, for example, to provide an individualized experience for students in an educational setting. For instance, the same material could be conveyed to all of the students, but the manner of delivery (e.g., message content, delivery platform, etc.) could vary by student according to each student's needs and abilities. The unique messages could also be used to dynamically tailor the content of electronic billboards or other displays in proximity to an individual.

Examples of the present disclosure are rooted in the concepts of archetypes and prototypes. Within the context of the present invention, an "archetype" may be understood to refer to the highest form of knowledge, which can exist only in the mind. In order to share this knowledge, humans must create and exchange "prototypes," i.e., imperfect models that are based on associated archetypes and that reside outside of the human mind (e.g., in written, spoken, or other form). In theory, the number/variations of prototypes that may correspond to any single archetype is infinite. However, prototypes can be costly to create. For instance, the creation of a prototype may involve costs associated with human labor, design technology and equipment choices, the number and type of communication methods deployed, the media and format of the prototype, and/or delivery/distribution of the prototype.

Scalability may also be an issue when creating prototypes. Within the context of the present disclosure, the scalability of a prototype refers to the number of tautological versions of the prototype that can be afforded. For instance, a design that is highly scalable can be more easily deployed using a customized message strategy, while a less scalable design is more likely to be deployed as part of an average message strategy.

In general, prototypes that are less costly to produce are more scalable, and more variations of them can be produced affordably. Such prototypes may be referred to as "dynamic prototypes." Dynamic prototypes may be conveyed (fully or in part) via the native capabilities of the human body, e.g., via spoken language, hand gestures, facial expressions, and/or body language. Dynamic prototypes may utilize ephemeral media such as light and sound, such that the dynamic prototypes dissipate nearly instantaneously once they are transmitted (or exist for only short periods of time).

Thus, the human mind may store an archetype, and then generate and distribute a corresponding dynamic prototype using the body's native capabilities. The dynamic prototype may be highly customized for an intended recipient or target, but the dynamic prototype is not saved (and therefore is limited in terms of the size of the audience who can receive it).

Conversely, prototypes that are more costly to produce are less scalable, and fewer variations of them can be produced affordably. Such prototypes may be referred to as "static prototypes." Static prototypes may be conveyed (fully or in part) via a technological means, e.g., via written language, iconography, illustrations, sculptures, audio and video recordings, and/or binary code. Static prototypes may use lasting or semi-lasting media such as stone, paper, ink, vinyl, magnetic tape, random access memory, and physical hard drives, such that the static prototypes can be saved or can persist for long periods of time (and can even be re-used multiple times in identical form).

Thus, the human mind may store an archetype, and then generate and distribute a corresponding static prototype using the technological means. The static prototype may be less customized for an intended recipient or target (relative to a dynamic prototype) due to cost; however, the static prototype may be saved and re-used in identical form (and therefore may be able to reach a larger audience than a dynamic prototype).

For the purposes of conveying information, the effectiveness of a prototype, whether dynamic or static, in communicating a corresponding archetype is directly proportional to the precision of the prototype's design for its intended recipient, i.e., how "customized" the prototype is for the intended recipient. Customized message strategies generally aim to generate fully customized or unique messages for intended recipients with as close to a 1:1 ratio as possible to maximize the intended recipient's understanding of the knowledge being communicated.

Automated systems for conveying knowledge or information typically rely on the use of static prototypes. However, because static prototypes are less scalable and more costly to produce (as compared to dynamic prototypes), the entities on whose behalf the systems operate are incentivized to employ an "average message strategy" rather than a customized message strategy. An average message strategy aims to generate prototypes that communicate knowledge to the largest number of intended recipients, using the fewest variations.

Within the context of the present disclosure, a "core message" may be understood to refer to a special type of archetype that is meant to create a functional relationship between an entity (e.g., a source of knowledge or information) and a target (e.g., an intended recipient of the knowledge or information).

Core messages may reside in the human mind, or within examples of the system disclosed herein. As such, the burden of storing the archetype is shifted from the human mind to the artificial intelligence (AI) system described herein, and the associated prototype production costs are eliminated or minimized. This, in turn, shifts (fully or in part) certain prototype designs from the more costly, "static" end of the spectrum to the less costly, "dynamic" end of the spectrum. Thus, more prototype variations can be deployed according to a customized message strategy.

A "customized message" or a "unique message" in this context may be understood to refer to a tautological, precise prototype of a core message that is designed to convey knowledge to a specific, individual target (or group of targets). This stands in contrast to the conventional "average message," which may be understood to refer to a static, imprecise prototype of a core message that is designed to convey knowledge to the largest possible group of targets.

Furthermore, within the context of the present invention, a "message" is understood to refer to information or knowledge to be conveyed to a target. A message may be broken up into "message fragments" or communications that are sent to the target. Tests of understanding (e.g., the target's understanding of the message) may be performed between the sending of two separate message fragments to the target.

Figure 1:
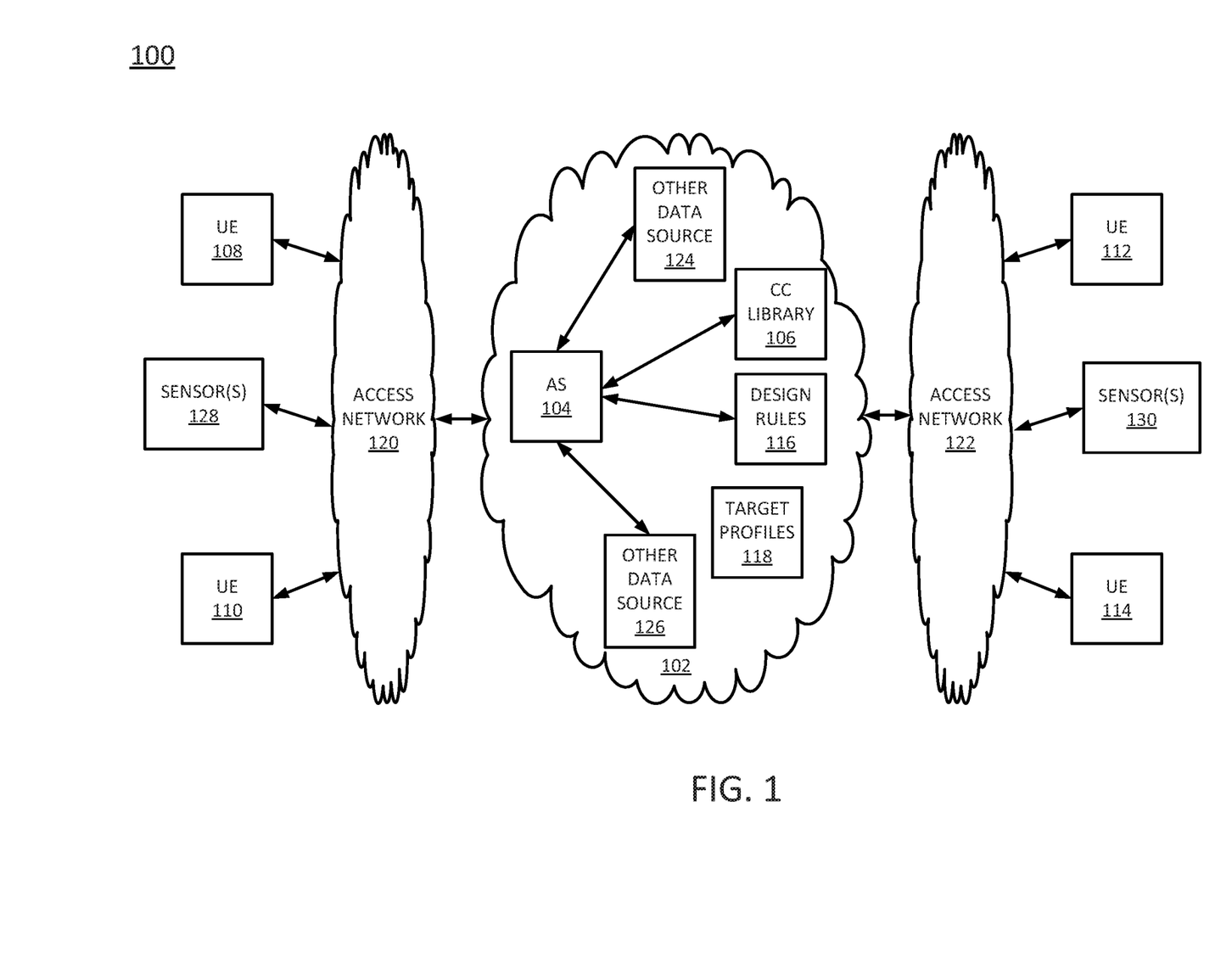
FIG. 1 illustrates an example network related to the present disclosure.

To better understand the present disclosure, FIG. 1 illustrates an example network 100 related to the present disclosure. The network 100 may be any type of communications network, such as for example, a traditional circuit switched network (CS) (e.g., a public switched telephone network (PSTN)) or an Internet Protocol (IP) network (e.g., an IP Multimedia Subsystem (IMS) network, an asynchronous transfer mode (ATM) network, a wireless network, a cellular network (e.g., 2G, 3G and the like), a long term evolution (LTE) network, and the like) related to the current disclosure. It should be noted that an IP network is broadly defined as a network that uses Internet Protocol to exchange data packets. Additional exemplary IP networks include Voice over IP (VoIP) networks, Service over IP (SoIP) networks, and the like.

In one embodiment, the network 100 may comprise a core network 102. In one example, the core network 102 may combine core network components of a cellular network with components of a triple play service network; where triple play services include telephone services, Internet services, and television services to subscribers. For example, core network 102 may functionally comprise a fixed mobile convergence (FMC) network, e.g., an IP Multimedia Subsystem (IMS) network. In addition, the core network 102 may functionally comprise a telephony network, e.g., an Internet Protocol/Multi-Protocol Label Switching (IP/MPLS) backbone network utilizing Session Initiation Protocol (SIP) for circuit-switched and Voice over Internet Protocol (VoIP) telephony services. The core network 102 may also further comprise an Internet Service Provider (ISP) network. In one embodiment, the core network 102 may include an application server (AS) 104 and a plurality of databases or data sources, including a core content library 106, a design rules database 116, a target profiles database 118, and other data sources 124 and 126. Although a single AS 104 and five databases or data sources 106, 116, 118, 124, and 126 are illustrated, it should be noted that any number of application servers and databases or data sources may be deployed. Furthermore, for ease of illustration, various additional elements of core network 102 are omitted from FIG. 1, including switches, routers, firewalls, web servers, and the like.

The core network 102 may be in communication with one or more wireless access networks 120 and 122. Either or both of the access networks 120 and 122 may include a radio access network implementing such technologies as: global system for mobile communication (GSM), e.g., a base station subsystem (BSS), or IS-95, a universal mobile telecommunications system (UMTS) network employing wideband code division multiple access (WCDMA), or a CDMA3000 network, among others. In other words, either or both of the access networks 120 and 122 may comprise an access network in accordance with any "second generation" (2G), "third generation" (3G), "fourth generation" (4G), Long Term Evolution (LTE), or any other yet to be developed future wireless/cellular network technology including "fifth generation" (5G) and further generations. The operator of core network 102 may provide a data service to subscribers via access networks 120 and 122. In one embodiment, the access networks 120 and 122 may all be different types of access networks, may all be the same type of access network, or some access networks may be the same type of access network and other may be different types of access networks. The core network 102 and the access networks 120 and 122 may be operated by different service providers, the same service provider or a combination thereof.

In one example, the access network 120 may be in communication with one or more user endpoint devices (also referred to as "endpoint devices" or "UE") 108 and 110, while the access network 122 may be in communication with one or more user endpoint devices 112 and 114.

In one example, the user endpoint devices 108, 110, 112, and 114 may be any type of subscriber/customer endpoint device configured for wireless communication such as a laptop computer, a Wi-Fi device, a Personal Digital Assistant (PDA), a mobile phone, a smartphone, an email device, a computing tablet, a messaging device, a wearable "smart" device (e.g., a smart watch or fitness tracker), a portable media device (e.g., an MP3 player), a gaming console, a portable gaming device, a set top box, a smart television, and the like. In one example, any one or more of the user endpoint devices 108, 110, 112, and 114 may have both cellular and non-cellular access capabilities and may further have wired communication and networking capabilities (e.g., such as a desktop computer). It should be noted that although only four user endpoint devices are illustrated in FIG. 1, any number of user endpoint devices may be deployed.

In one example, the endpoint devices 108, 110, 112, and 114 may have installed thereon an application that can communicate, over the access networks 120 and/or 122 and the core network 102, with the core content library 106, the design rules 116, and the other data sources 124 and 126. The application may perform the methods discussed below related to generating unique messages that are customized for an individual human recipient. For instance, the application may utilize data stored on the endpoint devices 108, 110, 112, and 114 and/or in the core content library 106, the design rules 116, and the other data sources 124 and 126 to generate unique messages for delivery to users of the endpoint devices. In another example, the application may communicate with the AS 104, which generates the unique messages for delivery via the endpoint devices. In this case, the user of an endpoint device 108, 110, 112, or 114 may choose to pay for a service via which the user can customize his or her own target profile in order to improve the customization or precision of the messages he or she receives.

Figure 4:
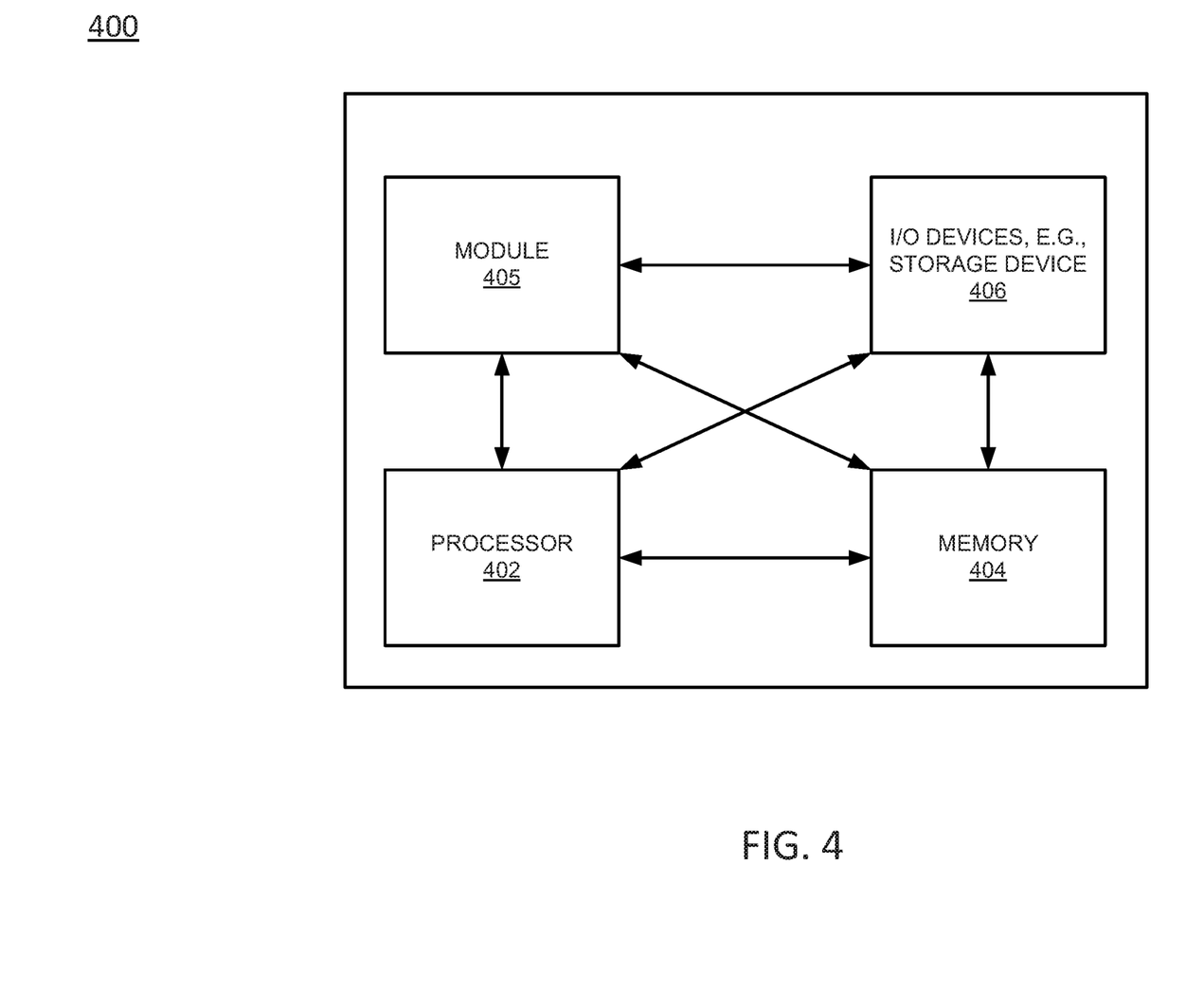
FIG. 4 depicts a high-level block diagram of a computing device specifically programmed to perform the functions described herein.

The AS 104 may comprise a general purpose computer or a quantum computer as illustrated in FIG. 4 and discussed below. In one example, the AS 104 may perform the methods discussed below related to generating messages that are customized for an individual human recipient. For instance, in one example, the AS 104 hosts an application that communicates with one or more of the UEs 108, 110, 112, and 114 and with the content library 106, the design rules 116, the target profiles database 118, and the other data sources 124 and 126. The application may utilize data stored on the endpoint devices 108, 110, 112, and 114 and/or in the core content library 106, the design rules 116, target profiles database 118, and the other data sources 124 and 126 to generate unique messages for delivery to users of the endpoint devices.

In one example, the core content library 106 may store core content, i.e., fixed inputs that are provided by the entity on whose behalf the automated system operates. Core content represents the archetypes that govern and describe what is to be communicated in a message. In one example, the core content comprises a collection of factual knowledge, which may or may not be categorically labeled. A unique message may be constructed by combining one or more of these fragments of factual knowledge in a way that makes sense for the message's intended recipient. In one example, core content may comprise any of the following: data fragments (e.g., facts and figures that describe a product, service, or anything else to be communicated in a message), visual assets (e.g., logos, icons, and/or end tags), audible assets (e.g., machine voices, music, and/or sound effects), written assets (e.g., pre-determined language such as taglines or legal disclaimers), and haptic assets (e.g., vibration patterns).

In one example, the design rules database 116 stores a plurality of parameters that control the look and feel of unique messages, e.g., so that the unique messages fit a unified design strategy. Examples of design rules may include, for instance, the visual design of a message (e.g., color, font, animation, transitions, and/or sign language to be used), the audible design of a message (e.g., the tone of voice, speed, cadence, sound effects, and/or audible language to be used), the haptic design of a message (e.g., the haptics and/or braille language to be used), and/or the visual aids to be included in a message (e.g., lists, tables, maps, forms, and/or calendars). The design rules may be programmed by an entity who controls the AS 104 or an application hosted thereon and may be updated by the entity at any time. In another example, the entity may subscribe to a service that that maintains and updates fixed inputs, such as the design rules, on the entity's behalf. The service may be provided by a telecommunications service provider.

In one example, the target profiles database 118 stores profiles for various known targets, i.e., intended recipients of unique messages. As discussed in greater detail below, each stored target profile may be similar to a survey and may comprise a plurality of categories of data fields, where the data fields may be filled by mining available data sources associated with the corresponding target (e.g., social media accounts, device and/or application authentication information, public data sources, private data sources for which access has been granted by the target, etc.). Additionally, a target profile may store information explicitly provided by the corresponding target.

The other data sources 124 and 126 may comprise sources of data controlled by parties other than the entity who controls the AS 104 or the application hosted thereon. For instance, the other sources of data 124 and 126 may comprise servers, databases, and the like associated with Internet web pages, social media services, public data sources, and the like.

In some examples, the network 100 may further include a sensor or sensors 128 and 130. These sensors 128 and 130 may comprise software and/or hardware sensors that are strategically placed in various physical locations. These sensors 128 and 130 may detect features or qualities of targets who are actively attempting to engage with the entity who controls the AS 104 or the application hosted thereon. These sensors 128 and 130 may also detect "passive" targets, e.g., targets who are not actively attempting to engage with the entity, but who might nevertheless be in a position to receive unique messages (e.g., due to their physical location). The sensors 128 may include, for instance, cameras, microphones, keyboards, touch screens, or any other types of input devices or sensors that can be used to gather information directly from a target.

It should also be noted that as used herein, the terms "configure" and "reconfigure" may refer to programming or loading a computing device with computer-readable/computer-executable instructions, code, and/or programs, e.g., in a memory, which when executed by a processor of the computing device, may cause the computing device to perform various functions. Such terms may also encompass providing variables, data values, tables, objects, or other data structures or the like which may cause a computer device executing computer-readable instructions, code, and/or programs to function differently depending upon the values of the variables or other data structures that are provided.

Those skilled in the art will realize that the network 100 has been simplified. For example, the network 100 may include other network elements (not shown) such as border elements, routers, switches, policy servers, security devices, a content distribution network (CDN) and the like. The network 100 may also be expanded by including additional endpoint devices, sensors, access networks, network elements, application servers, etc. without altering the scope of the present disclosure.

Figure 2:
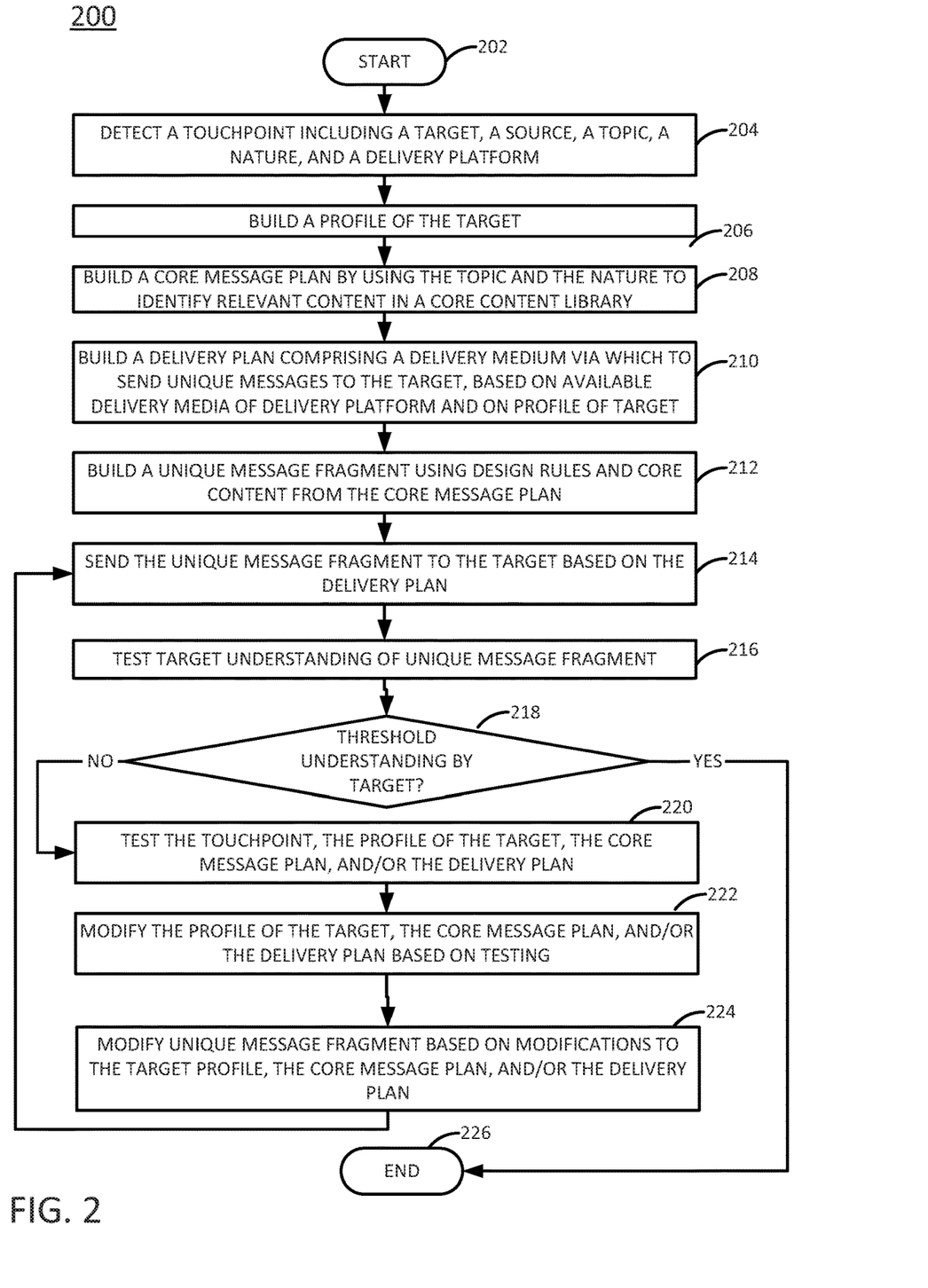
FIG. 2 illustrates a flowchart of an example method for generating messages that are customized for an individual human recipient.

To further aid in understanding the present disclosure, FIG. 2 illustrates a flowchart of an example method 200 for generating messages that are customized for an individual human recipient. In one example, the method 200 may be performed by an application server, e.g., AS 104 illustrated in FIG. 1. However, in other examples, the method 200 may be performed by another device. For instance, a UE 108, 110, 112, or 114 could also perform all or some steps of the method 200. As such, any references in the discussion of the method 200 to the AS 104 of FIG. 1 are not intended to limit the means by which the method 200 may be performed.

The method 200 begins in step 202. In step 204, a touchpoint is detected. In one example, a touchpoint is created when a plurality of primary variable inputs are combined into a data set. In one example, the primary variable inputs comprise: a target, a source, a topic, a nature, and a delivery platform. As such, step 204 may include individually identifying, detecting, or otherwise obtaining the target, the source, the topic, the nature, and the delivery platform.

A target is a person, or a group of people, who is the intended recipient of a unique (e.g., customized) message. Knowing the target allows for the differentiation of a core message into at least one unique message. The target and information about the target may be identified through any one or more of a variety of techniques. For instance, in one example, the target may be identified through an authentication process, e.g., where a user authenticates him or herself directly to the AS 104 for the purposes of having unique messages generated. In another example, the target may be identified by pulling user information from a UE 108, 110, 112, or 114. In another example, computer vision (e.g., cameras in proximity to the target) can be used to identify the target by appearance (e.g., by face, eyes, or other features). In another example, the target may be identified by accessing social media information (e.g., social media accounts, profiles, etc.). In another example, the target may be identified by using a search engine to locate information about an individual on the Internet.

A source is an event or an origin that generates the touchpoint. In some cases, the source and the target may be one and the same. A source could be detected through a direct interaction with an individual (e.g., where the individual issues a command or a question via an application executing on a UE 108, 110, 112, or 114, or where the individual selects a specific button or hyperlink displayed on a UE). A source could also be detected through an indirect interaction with an individual (e.g., where a UE detects that the individual is waking up, driving, signing into an application, or the like). A source could also be detected when new information or a reminder that is relevant to a relationship between the target and an entity trying to convey information to the target (e.g., another individual, an organization, or the like) is detected.

A topic is a subject around which the interaction for which the messages will be generated revolves. Knowing the topic allows for the core content library (e.g., core content library 106 of FIG. 1) to be queried for relevant core content that can be used to construct unique messages. In one example, a topic may be identified from a direct or explicit selection of a topic by the target (e.g., a click, drag, touch, or other selection via an input/output device such as a keyboard, a mouse, a track pad, a touch screen, or the like). In another example, a topic may be identified using natural language processing to extract meaning from an utterance made by the target. In another example, a topic may be identified using text recognition to extract meaning from a written or typed message. In another example, a topic may be identified using image processing to extract meaning from a series of sign language gestures.

A nature is a goal or desired outcome of the interaction for which the messages will be generated. In one example, the nature may be an intent to pose a question or query (e.g., to seek knowledge or information). In another example, the nature may be an intent to perform a task (e.g., to complete a step or series of steps). In another example, the nature may be an intent to issue a command (e.g., to supply information, feedback, or suggestions).

A delivery platform is the device (e.g., UE 108, 110, 112, or 114) intended to be used by the target to receive the unique message. For instance, the delivery platform may comprise a touch screen, a smart home device (e.g., a speaker), a television, a virtual reality or augmented reality device (e.g., a head mounted display), an electronic book reader, a billboard, a slide show, a braille display, or the like.

In step 206, a profile of the target is built. In one example, the profile is similar to a survey and comprises a plurality of categories of data fields, where the data fields may be filled by mining available data sources associated with the target (e.g., social media accounts, device and/or application authentication information, public data sources, private data sources for which access has been granted by the target, etc.). For instance, the profile may include data fields for: identification (e.g., name, nickname, age, gender, contact information, and/or biomarkers of the target), biographical information (e.g., birthplace, hometown, education career, and/or life story of the target), ad hominem information (e.g., learning style, personal interests, hobbies, and/or political affiliations of the target), emotional information (e.g., current emotional state and/or historical emotional state of the target), accessibility information (e.g., impairments and/or disabilities of the target, including, visual, hearing, and/or cognitive impairments), and expertise (e.g., the level of experience of the target in relationship to the topic and nature supplied by the touchpoint). In one example, building the profile comprises trying to populate as many of the data fields as possible. Building the profile may also include assessing and/or rating the reliability of the data used to populate the data fields in order to identify categories where the available data may be weak (e.g., of questionable reliability), and modifying the means by which or sources from which data is acquired in order to improve the reliability of the data (e.g., to at least a threshold reliability).

In step 208, a core message plan is built. A core message plan comprises core content, selected from the core content library, which can serve as the starting point for creating a unique message on behalf of the target. In this sense, the core message plan comprises a probabilistic outcome for the fastest possible acquisition of knowledge. In one example, the core message plan is built by using the topic and nature provided by the touchpoint to search the core content library for relevant core content.

In step 210, a delivery plan is built. A delivery plan comprises a selection of a delivery medium by which to deliver unique messages to the target. In one example, the selection of the delivery medium may be based on the available delivery media of the delivery platform, as well as on information in the target profile. For instance, if the target profile indicates that the target is visually impaired, the delivery plan might rule out the visual capabilities (e.g., display) of a smart phone as a potential delivery platform, but might consider using the audible capabilities (e.g., speaker). Or if the target is walking past an in-store television display where no speakers are available, the delivery plan might indicate that a visible message should be displayed on the television display and should forgo using the display's audio capabilities (if any).

Collectively, the target profile, the core message plan, and the delivery plan may be considered secondary variable inputs, since they are built upon the primary variable inputs of the touchpoint detected in step 204. However, as described herein, primary and secondary variable inputs may be combined with each other, as well as with design rules and core content, to produce unique messages. In one example, steps 206, 208, and 210 are performed simultaneously during a common "initialization" phase of the method 200.

In step 212, a unique message fragment is built (where the item built is referred to as a message "fragment," because it is part of the overall message that may be tested). In one example, the unique message fragment is built using design rules (e.g., from the design rules database 116 of FIG. 1) and core content (e.g., from the core message plan). The design rules and core content are considered to be fixed inputs to the method 200 and may be programmed by the entity on whose behalf the method 200 operates.

In step 214, the unique message fragment is sent to the target based on the delivery plan. In one example, the message is sent via the delivery platform identified in step 204 and the delivery medium selected in step 210.

In step 216, the target is tested for understanding of the unique message fragment. That is, it is determined whether a threshold amount of the information in the unique message fragment was understood by the target. In one example, the threshold is one hundred percent understanding; however, in other examples, the threshold may be lower. In other words, step 216 seeks to confirm that the nature of the touchpoint (e.g., the goal of the customized unique message(s)) has been achieved. In one example, the target's understanding may be tested by soliciting feedback from the target. For instance, in one example, the target may be asked whether he or she understood the unique message fragment that was delivered in step 214. In another example, one or more queries may be presented to the target to test the target's understanding.

In step 218, it is determined, based on the testing, whyether the threshold understanding has been achieved by the target. If it is determined in step 218 that the threshold understanding has been achieved, then the method 200 may end in step 226. If, however, if it determined in step 218 that the threshold understanding has not been achieved, then the method 200 may proceed to step 220. In step 220, the touchpoint, the target profile, the core message plan, and/or the delivery plan are tested. In one example, the touchpoint, the target profile, the core message plan, and/or the delivery plan may be tested by soliciting feedback from the target. For instance, in one example, the target may be queried for new or additional information (e.g., by asking specific questions to fill in gaps in the target profile). In another example, the target may be asked to verify the accuracy of information acquired through data mining (e.g., by asking whether data already contained in the target profile, such as home address, birthdate, etc., is accurate and soliciting corrections when it is not). In another example, the target may be asked to clarify data contained in the target profile (e.g., is this telephone number associated with a land line or a wireless phone?). In another example, the target may be asked to restate a query in a different way, for instance if the target submitted a query that was not understood. In another example, the target may be asked whether he or she understood a unique message that was delivered.

In step 222, the target profile, the core message plan, and/or the delivery plan is modified based on the testing performed in step 220. In step 222, new or additional data obtained as a result of the testing, such as feedback from the target, may be used to modify the target profile, the core message plan, and/or the delivery plan. For instance, data contained in the target profile may be changed, updated, or added.

In step 224, the unique message fragment may be modified based on the modifications to the target profile, the core message plan, and/or the delivery plan that were made in step 222. The method 200 may then return to step 214 and send the unique message fragment, as modified, to the user. The method 200 then proceeds as described above. The method 200 may repeat steps 214-224 as many times as is necessary to achieve the threshold understanding of the unique message fragments by the target, before ending in step 226.

In one example, steps 214-224 may be performed at any time during performance of the method 200 following building of the target profile in step 206. In another example, the method 200 could also test to fill gaps in the target profile prior to step 214 (e.g., by asking questions such as, "Do you mind if I ask your name before we begin?").

Thus, the method 200 can be used to create unique messages that are tailored to the learning style, cognitive strengths, and/or physical (e.g., visual, auditory, etc.) abilities of the specific target/recipient. As such, there is a potentially infinite number of ways in which the same information can be conveyed to different targets.

Figure 3:
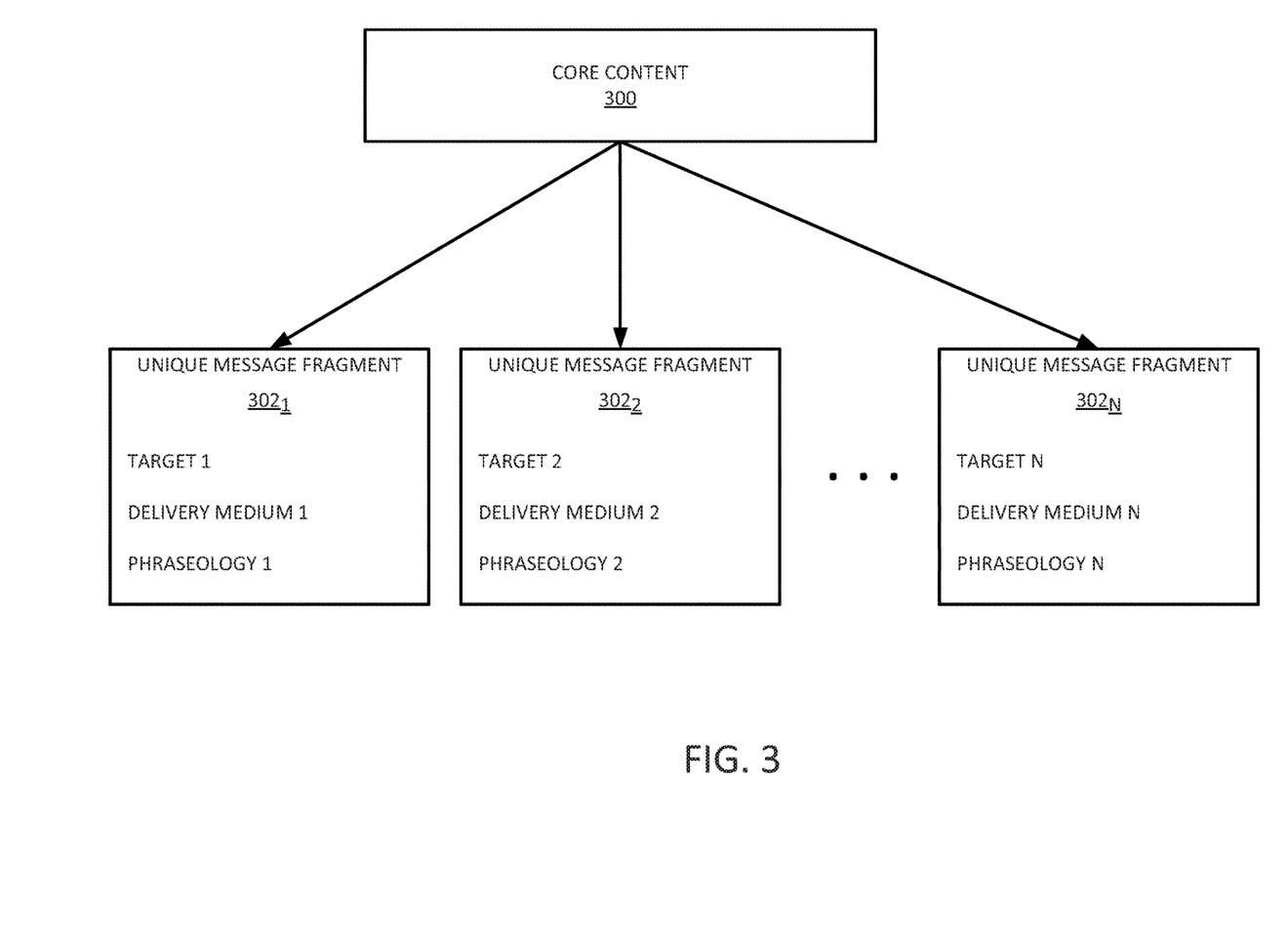
FIG. 3 illustrates an example instance of core content that can be transformed into a plurality of different customized messages.

FIG. 3, for instance, illustrates an example instance of core content 300 that can be transformed into a plurality of different unique message fragments $302_1$-$302_N$ (hereinafter individually referred to as a "unique message fragment 302" or collectively referred to as "unique message fragments 302"). As illustrated, each unique message fragment is built for a different target (e.g., of targets 1-N). As such, the phraseology and/or language used to express the core content 300 (e.g., of phraseologies 1-N) may vary from unique message fragment $302_1$ to unique message fragment $302_n$, based on the targets. For instance, if target 1 speaks English, then the unique message fragment $302_1$ may be phrased in the English language (and potentially further phrased in a regional dialect of the target 1). Similarly, if target 2 speaks Spanish, then the unique message fragment $302_2$ may be phrased in the Spanish language (and potentially further phrased in a regional dialect of the target 2).

In addition, the delivery media used to convey the unique message fragments 302 may also vary based on the target, as evidenced by the fact that each unique message fragment 302 is delivered via a different delivery medium (e.g., of delivery media 1-N). For instance, if target 1 has a hearing impairment, then the delivery medium 1 via which the unique message fragment $302_1$ is delivered may be a visual medium, such as a text message. Similarly, if target 2 has a visual impairment, then the delivery medium 2 via which the unique message fragment $302_2$ is delivered may be an audible medium, such as a synthesized or recorded voice message.

Although not expressly specified above, one or more steps of the method 200 may include a storing, displaying and/or outputting step as required for a particular application. In other words, any data, records, fields, and/or intermediate results discussed in the method can be stored, displayed and/or outputted to another device as required for a particular application. Furthermore, operations, steps, or blocks in FIG. 2 that recite a determining operation or involve a decision do not necessarily require that both branches of the determining operation be practiced. In other words, one of the branches of the determining operation can be deemed as an optional step. Furthermore, operations, steps or blocks of the above described method can be combined, separated, and/or performed in a different order from that described above, without departing from the examples of the present disclosure.

FIG. 4 depicts a high-level block diagram of a computing device specifically programmed to perform the functions described herein. For example, any one or more components or devices illustrated in FIG. 1 or described in connection with the method 200 may be implemented as the system 400. For instance, a user endpoint device or an application server could be implemented as illustrated in FIG. 4.

As depicted in FIG. 4, the system 400 comprises a hardware processor element 402, a memory 404, a module 405 for generating messages that are customized for an individual human recipient, and various input/output (I/O) devices 406.

The hardware processor 402 may comprise, for example, a microprocessor, a central processing unit (CPU), or the like. The memory 404 may comprise, for example, random access memory (RAM), read only memory (ROM), a disk drive, an optical drive, a magnetic drive, and/or a Universal Serial Bus (USB) drive. The module 405 for generating messages that are customized for an individual human recipient may include circuitry and/or logic for performing special purpose functions relating to building, testing, and/or modifying customized messages. The input/output devices 406 may include, for example, a camera, a video camera, storage devices (including but not limited to, a tape drive, a floppy drive, a hard disk drive or a compact disk drive), a receiver, a transmitter, a speaker, a microphone, a transducer, a display, a speech synthesizer, a haptic device, a neurotransmitter, an output port, or a user input device (such as a keyboard, a keypad, a mouse, and the like).

Although only one processor element is shown, it should be noted that the general-purpose computer may employ a plurality of processor elements. Furthermore, although only one general-purpose computer is shown in the Figure, if the method(s) as discussed above is implemented in a distributed or parallel manner for a particular illustrative example, i.e., the steps of the above method(s) or the entire method(s) are implemented across multiple or parallel general-purpose computers, then the general-purpose computer of this Figure is intended to represent each of those multiple general-purpose computers. Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a general purpose computer or any other hardware equivalents, e.g., computer readable instructions pertaining to the method(s) discussed above can be used to configure a hardware processor to perform the steps, functions and/or operations of the above disclosed method(s). In one example, instructions and data for the present module or process 405 for generating messages that are customized for an individual human recipient (e.g., a software program comprising computer-executable instructions) can be loaded into memory 404 and executed by hardware processor element 402 to implement the steps, functions or operations as discussed above in connection with the example method 200. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method(s) can be perceived as a programmed processor or a specialized processor. As such, the present module 405 for generating messages that are customized for an individual human recipient (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. More specifically, the computer-readable storage device may comprise any physical devices that provide the ability to store information such as data and/or instructions to be accessed by a processor or a computing device such as a computer or an application server.

While various examples have been described above, it should be understood that they have been presented by way of example only, and not limitation. Thus, the breadth and scope of a preferred example should not be limited by any of the above-described examples, but should be defined only in accordance with the following claims and their equivalents.

What is claimed is:

1. A method, comprising:
    identifying, by a processing system, a target to whom a message is to be sent, a goal of the message, and a topic of the message;
    retrieving, by the processing system, information relevant to the topic from a library of core content, wherein core content of the library of core content comprises a plurality of fixed inputs;
    building, by the processing system, the message using the information retrieved from the library of core content, wherein the building comprises presenting the information retrieved from the library of core content in a manner that is customized for the target;
    delivering, by the processing system, the message to the target via a delivery medium, wherein a selection of the delivery medium is customized for the target;
    soliciting, by the processing system, feedback from the target, wherein the feedback comprises at least one selected from a group of: a confirmation from the target that the target understands the message and an answer provided by the target in response to a query, where the query is designed to test an understanding of the message by the target; and
    confirming, by the processing system and based on the feedback, that the target understands a threshold amount of information conveyed in the message, wherein the threshold amount is greater than zero percent of the information conveyed in the message, but less than one hundred percent of the information conveyed in the message.

2. The method of claim 1, wherein identifying the target comprises:
    obtaining, by the processing system, information about the target; and
    building, by the processing system, a profile of the target using the information about the target.

3. The method of claim 2, wherein the profile includes biographical information of the target, accessibility information about the target, and expertise of the target relative to the topic and the goal.

4. The method of claim 2, wherein the obtaining comprises:
    mining, by the processing system, a social media account associated with the target for the information about the target.

5. The method of claim 2, wherein the obtaining comprises:
    pulling, by the processing system, the information about the target from a computing device used by the target.

6. The method of claim 2, wherein the obtaining comprises:
    receiving, by the processing system, at least some of the information about the target directly from the target.

7. The method of claim 2, further comprising:
    modifying, by the processing system, the profile in response to the feedback;
    building, by the processing system, a new message designed to achieve an understanding of the threshold amount of information by the target, based on the profile as modified; and
    delivering, by the processing system, the new message to the target, wherein the message and the new message are delivered to the target in a same interaction with the target.

8. The method of claim 1, wherein the delivery medium is selected based on a physical impairment of the target.

9. The method of claim 1, wherein the delivery medium is selected based on a capability of a device in proximity to the target.

10. The method of claim 1, wherein the building further comprises presenting the information retrieved from the library of core content in a manner that is consistent with a design rule that controls a look and feel of the message.

11. The method of claim 1, further comprising:
    modifying, by the processing system, the information retrieved from the core content library in response to the feedback;

building, by the processing system, a new message based on the information retrieved from the core content library as modified; and delivering, by the processing system, the new message to the target.

12. The method of claim 1, further comprising:

selecting, by the processing system, a new delivery medium in response to the feedback; and delivering, by the processing system, the message to the target via the new delivery medium.

13. The method of claim 1, wherein the information retrieved from the library of core content is presented in a manner that is tailored to a learning style of the target.

14. The method of claim 1, wherein the information retrieved from the library of core content is presented in a manner that is tailored to a cognitive strength of the target.

15. The method of claim 1, wherein the goal of the message is to answer a query posed by the target.

16. The method of claim 1, wherein the goal of the message is to carry out a task requested by the target.

17. The method of claim 1, wherein the goal of the message is to carry out a command provided by the target.

18. A device, comprising:

a processor; and a computer-readable medium storing instructions which, when executed by the processor, cause the processor to perform operations, the operations comprising:

identifying a target to whom a message is to be sent, a goal of the message, and a topic of the message;

retrieving information relevant to the topic from a library of core content, wherein core content of the library of core content comprises a plurality of fixed inputs;

building the message using the information, wherein the building comprises presenting the information retrieved from the library of core content in a manner that is customized for the target;

delivering the message to the target via a delivery medium, wherein a selection of the delivery medium is customized for the target;

soliciting feedback from the target, wherein the feedback comprises at least one selected from a group of: a confirmation from the target that the target understands the message and an answer provided by the target in response to a query, where the query is designed to test an understanding of the message by the target; and confirming, based on the feedback, that the target understands a threshold amount of information conveyed in the message, wherein the threshold amount is greater than zero percent of the information conveyed in the message, but less than one hundred percent of the information conveyed in the message.

19. A non-transitory computer-readable storage medium storing instructions which, when executed by a processor, cause the processor to perform operations, the operations comprising:

identifying a target to whom a message is to be sent, a goal of the message, and a topic of the message;

retrieving information relevant to the topic from a library of core content, wherein core content of the library of core content comprises a plurality of fixed inputs;

building the message using the information, wherein the building comprises presenting the information retrieved from the library of core content in a manner that is customized for the target;

delivering the message to the target via a delivery medium, wherein a selection of the delivery medium is customized for the target;

soliciting feedback from the target, wherein the feedback comprises at least one selected from a group of: a confirmation from the target that the target understands the message and an answer provided by the target in response to a query, where the query is designed to test an understanding of the message by the target; and confirming, based on the feedback, that the target understands a threshold amount of information conveyed in the message, wherein the threshold amount is greater than zero percent of the information conveyed in the message, but less than one hundred percent of the information conveyed in the message.

20. The method of claim 1, wherein the delivering further comprises:

selecting, by the processing system, a device via which to present the message to the target, wherein the selection of the device is customized for the target, and wherein the device is capable of presenting the message via the delivery medium.

\* \* \* \* \*